(12) United States Patent
Nakanishi et al.

(10) Patent No.: US 8,813,805 B2
(45) Date of Patent: Aug. 26, 2014

(54) FILAMENT WINDING APPARATUS

(75) Inventors: Hideaki Nakanishi, Kyoto (JP); Akira Maeda, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 398 days.

(21) Appl. No.: 13/394,687

(22) PCT Filed: Sep. 9, 2010

(86) PCT No.: PCT/JP2010/065462
§ 371 (c)(1),
(2), (4) Date: Mar. 7, 2012

(87) PCT Pub. No.: WO2011/030808
PCT Pub. Date: Mar. 17, 2011

(65) Prior Publication Data
US 2012/0168088 A1    Jul. 5, 2012

(30) Foreign Application Priority Data
Sep. 10, 2009    (JP) .................... 2009-209253

(51) Int. Cl.
*B65H 81/00*    (2006.01)
*B29C 53/80*    (2006.01)
*B29C 70/32*    (2006.01)
*B29C 70/08*    (2006.01)

(52) U.S. Cl.
CPC ............. *B29C 70/32* (2013.01); *B29C 53/8066* (2013.01); *B29C 70/086* (2013.01)
USPC .......... 156/429; 156/169; 156/173; 156/175; 156/149; 156/393; 156/430; 156/578

(58) Field of Classification Search
CPC ............................. B29C 53/8066; B29C 70/32
USPC ......... 156/171, 148, 149, 173, 175, 425, 429, 156/430, 432, 393, 578
See application file for complete search history.

(56) References Cited

U.S. PATENT DOCUMENTS

| | | | | |
|---|---|---|---|---|
| 3,201,298 A | * | 8/1965 | Baker | 156/431 |
| 3,378,427 A | * | 4/1968 | McClean | 156/431 |
| 3,449,484 A | * | 6/1969 | Medney | 264/159 |
| 4,494,436 A | * | 1/1985 | Kruesi | 87/23 |
| 2009/0107628 A1 | | 4/2009 | Uozumi et al. | 156/278 |

FOREIGN PATENT DOCUMENTS

| | | | |
|---|---|---|---|
| GB | 1433360 A | * | 4/1976 |
| JP | 48-44661 A | * | 12/1973 |
| JP | 58-114918 A | * | 7/1983 |

(Continued)

*Primary Examiner* — Jeff Aftergut
(74) *Attorney, Agent, or Firm* — DLA Piper LLP (US)

(57) ABSTRACT

Provided is a filament winding apparatus (1) which moves a liner (2) while rotating the liner (2) and winds a fiber bundle (FB) around the outside peripheral face (2a) of the liner (2), said fiber bundle (FB) being guided by a fiber-feeding guide (44) positioned around the trajectory of the liner (2). The filament winding apparatus has a resin-spraying nozzle (45) for spraying a resin onto the fiber bundle (FB) at a position before the fiber bundle is wound around the liner (2), and the resin-spraying nozzle (45) is disposed so as to spray the resin onto the downstream side of the rotation direction of the liner (2) relative to an imaginary line (VL1) defied by a straight line connecting the spray nozzle (45N) of the resin-spraying nozzle (45) with the rotation axis of the liner (2).

9 Claims, 14 Drawing Sheets

(56) References Cited

FOREIGN PATENT DOCUMENTS

| | | |
|---|---|---|
| JP | 08-103967 | 4/1996 |
| JP | 08-108487 | 4/1996 |
| JP | 08-267583 | 10/1996 |
| JP | 09-262910 | 10/1997 |
| JP | 2007-260974 | 10/2007 |
| JP | 2009-107202 | 5/2009 |
| KR | 20030038277 A | 5/2003 |

* cited by examiner

Fig. 6
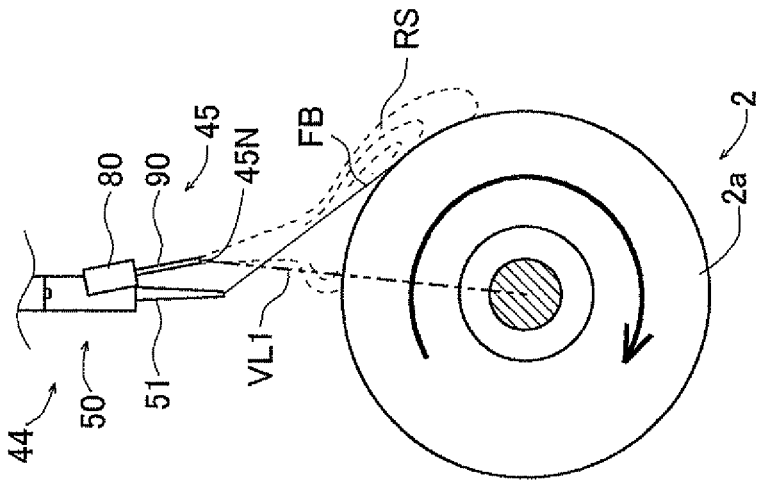
(A)
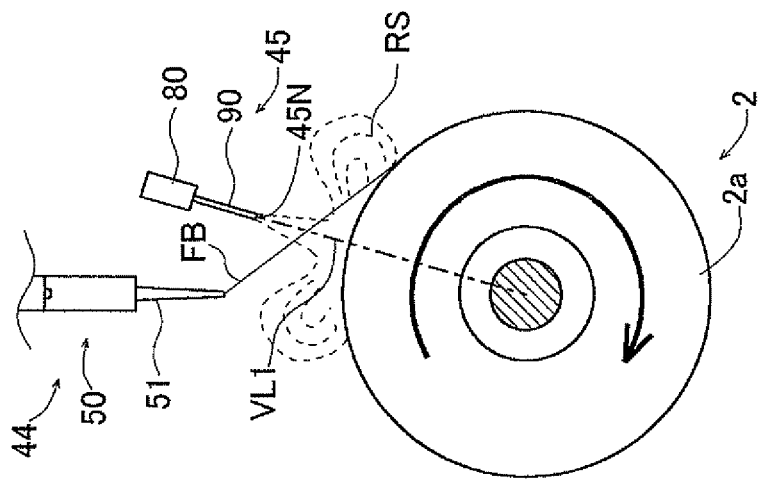
(B)

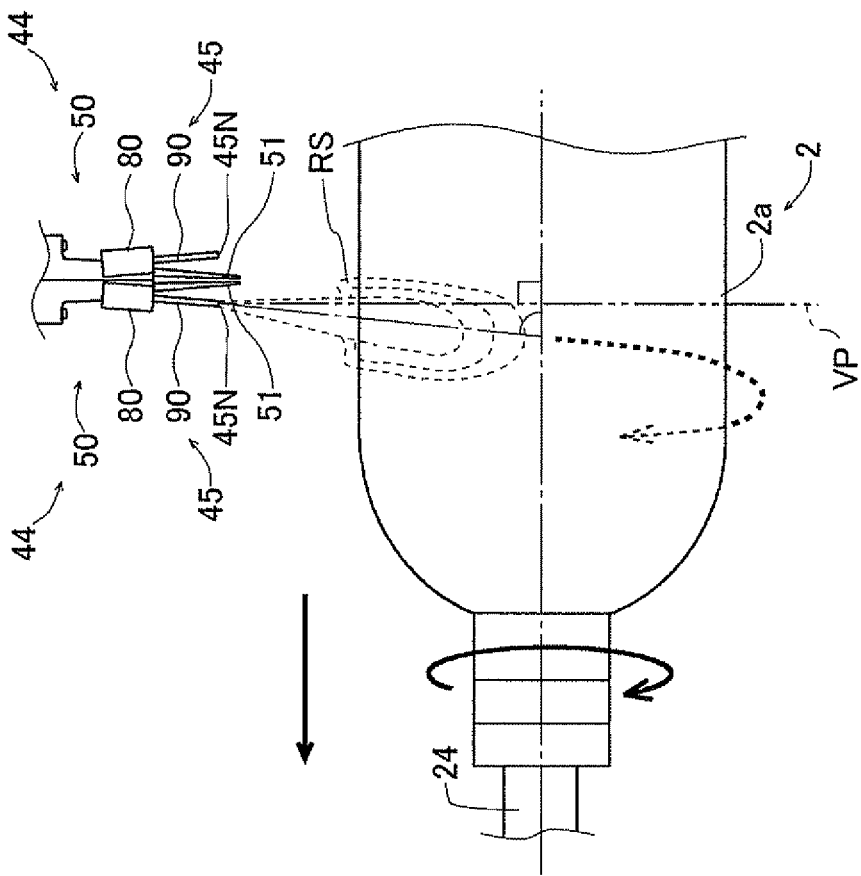
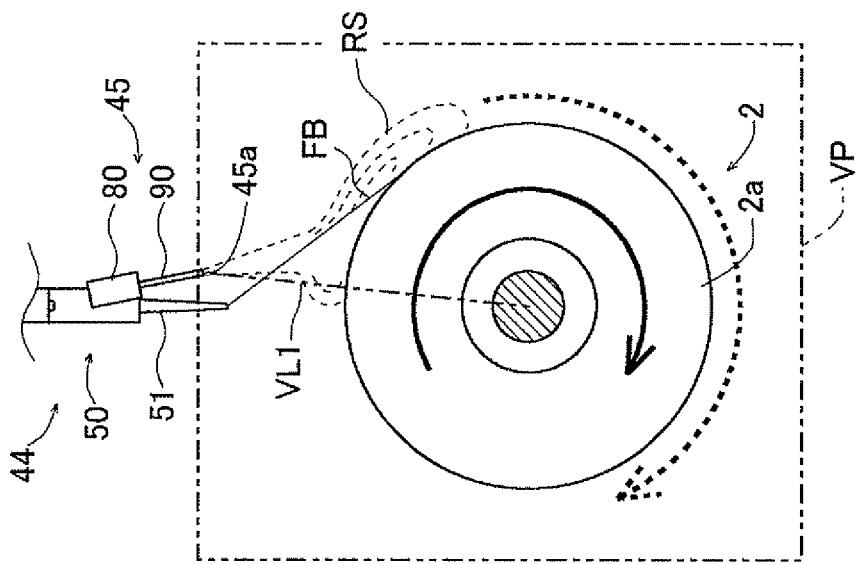
Fig. 8

Fig. 13
(A) 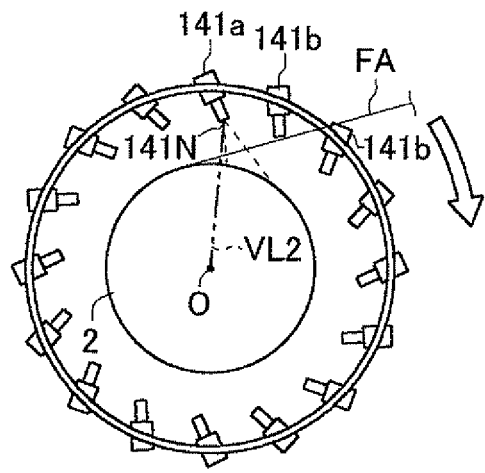
(B) 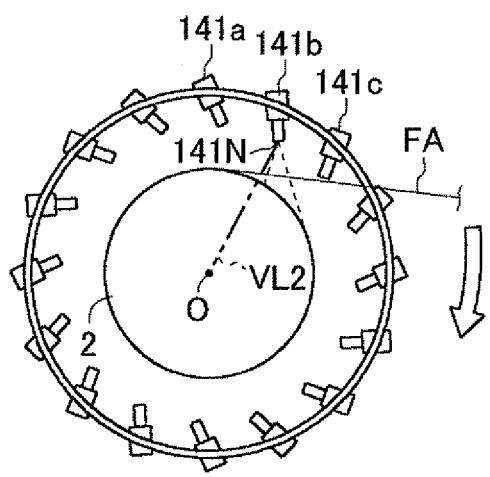
(C) 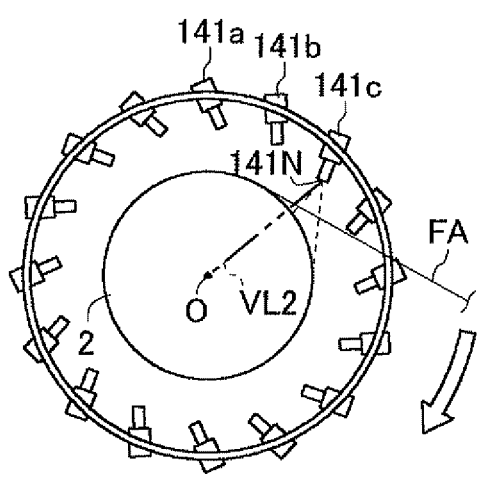

FILAMENT WINDING APPARATUS

TECHNICAL FIELD

The present invention relates to an art of a filament winding apparatus. In more detail, the present invention relates to an art for preventing available percentage of resin from being worsened at the time of impregnation of a fiber bundle with resin by a filament winding apparatus.

BACKGROUND ART

Conventionally, a filament winding apparatus is known in which a fiber bundle impregnated with resin is wound round an outside peripheral face of a liner. As a method for impregnating a fiber bundle with resin, a method in which the fiber bundle is soaked in a resin tank (for example, see the Patent Literature 1) and a method in which resin is sprayed to the fiber bundle (for example, see the Patent Literature 2) are known.

However, in the method in which the fiber bundle is soaked in the resin tank, resin adheres to a guide roller which transfers the fiber bundle after soaked and the like, whereby the frequency of the maintenance is increased. On the other hand, in the method in which resin is sprayed to the fiber bundle, the adhesion of resin to the guide roller and the like can be prevented by spraying resin to the fiber bundle just before winding the fiber bundle round the liner, but there is a problem that scattering of the sprayed resin worsens the available percentage of the resin.

Patent Literature 1: the Japanese Patent Laid Open Gazette Hei. 8-108487
Patent Literature 2: the Japanese Patent Laid Open Gazette Hei. 9-262910

DISCLOSURE OF INVENTION

Problems to be Solved by the Invention

The purpose of the present invention is to provide an art for preventing available percentage of resin from being worsened at the time of impregnation of a fiber bundle with resin by a filament winding apparatus employing a method in which resin is sprayed to the fiber bundle.

Means for Solving the Problems

According to the first aspect of the present invention, a filament winding apparatus in which a liner is transferred while being rotated and a fiber bundle guided by a fiber supply guide arranged around a locus of the liner is wound round an outside peripheral face of the liner, includes a resin supply nozzle spraying resin to the fiber bundle before wound round the liner. The resin supply nozzle sprays resin to a downstream side in the rotational direction of the liner about an imaginary line determined by a straight line connecting a spray port of the resin supply nozzle to a rotational axis of the liner.

According to the second aspect of the present invention, in the filament winding apparatus according to the first aspect of the present invention, the resin supply nozzle sprays resin in parallel to an imaginary plane determined by a plane perpendicular to the transfer direction of the liner.

According to the third aspect of the present invention, in the filament winding apparatus according to the first aspect of the present invention, the resin supply nozzle sprays resin to a front side of the liner about an imaginary plane determined by a plane perpendicular to the transfer direction of the liner and crossing the spray port.

According to the fourth aspect of the present invention, in the filament winding apparatus according to the first aspect of the present invention, the resin supply nozzle is arranged so as to spray resin in parallel to or substantially parallel to the transfer direction of the fiber bundle before wound round the liner.

According to the fifth aspect of the present invention, in the filament winding apparatus according to the first aspect of the present invention, the resin supply nozzle can advance/retract about the outside peripheral face of the liner.

According to the sixth aspect of the present invention, in the filament winding apparatus according to the first aspect of the present invention, the resin supply nozzle includes a first resin supply nozzle arranged at a front side in the transfer direction of the liner and a second resin supply nozzle arranged at a rear side in the transfer direction of the liner, and the first resin supply nozzle sprays resin to the fiber bundle mainly and the second resin supply nozzle sprays resin to the fiber bundle complementarily.

According to the seventh aspect of the present invention, a filament winding apparatus having a hoop winding device comprises a winding part rotating a fiber bundle about a liner which is to hold the fiber bundle so as to wind the fiber bundle round the liner, and a resin impregnation part in which a plurality of resin injection nozzles injecting resin to the fiber bundle before wound round the liner are arranged around the liner. Each of the resin supply nozzle is arranged so as to spray resin to a downstream side in the rotational direction of the liner about an imaginary line determined by a straight line connecting a spray port of the resin supply nozzle to a rotational axis of the liner.

According to the eighth aspect of the present invention, in the filament winding apparatus according to the seventh aspect of the present invention, one or more resin injection nozzles of the plurality of the resin injection nozzles spray resin to the rotated fiber bundle, and the resin spray nozzles spraying the resin is switched synchronously with the rotation of the fiber bundle.

According to the ninth aspect of the present invention, in the filament winding apparatus according to the eighth aspect of the present invention, the resin impregnation part stops the spraying by the resin injection nozzles before switched after starting the spraying by the resin injection nozzles after switched.

Effect of the Invention

The present invention constructed as the above brings the following effects.

According to the first aspect of the present invention, scattering of the resin sprayed to the fiber bundle can be suppressed, whereby the available percentage of resin can be prevented from being worsened.

According to the second aspect of the present invention, the fiber bundle before wound round the liner can be impregnated with resin certainly. Scattering of the resin sprayed to the fiber bundle can be suppressed, whereby the available percentage of resin can be prevented from being worsened.

According to the third aspect of the present invention, the fiber bundle before wound round the liner can be impregnated with resin certainly. Scattering of the resin sprayed to the fiber bundle can be suppressed, whereby the available percentage of resin can be prevented from being worsened. Furthermore, since the sprayed resin flows along the outside peripheral face of the liner, the fiber bundle after wound round the liner can be impregnated with resin further.

According to the fourth aspect of the present invention, the fiber bundle before wound round the liner can be impregnated with resin more certainly. Scattering of the resin sprayed to the fiber bundle can be suppressed, whereby the available percentage of resin can be prevented from being worsened. Furthermore, since the sprayed resin flows along the outside peripheral face of the liner, the fiber bundle after wound round the liner can be impregnated with resin further.

According to the fifth aspect of the present invention, by controlling the distance between the resin supply nozzle and the liner suitably, the fiber bundle before wound round the liner can be impregnated with resin certainly. Scattering of the resin sprayed to the fiber bundle can be suppressed, whereby the available percentage of resin can be prevented from being worsened.

According to the sixth aspect of the present invention, the first resin supply nozzle sprays resin to the fiber bundle mainly and the second resin supply nozzle sprays resin to the fiber bundle complementarily, whereby the fiber bundle can be impregnated with resin certainly even if the winding speed of the fiber bundle or the like is changed.

According to the seventh aspect of the present invention, each of the resin supply nozzle is arranged so as to spray resin to the downstream side in the rotational direction of the liner about the imaginary line determined by the straight line connecting the spray port of the resin supply nozzle to the rotational axis of the liner, whereby the resin can be sprayed aslant to the liner. Accordingly, scattering of the resin sprayed to the fiber bundle can be suppressed, whereby the available percentage of resin can be prevented from being worsened.

According to the eighth aspect of the present invention, one or more resin injection nozzles spray resin to the rotated fiber bundle, and the resin spray nozzles spraying the resin is switched synchronously with the rotation of the fiber bundle, whereby impregnation of the fiber bundle with the resin can be performed without spraying resin uselessly. The resin colliding with the liner and scattering is engulfed by the resin spray ejected from the next resin spray nozzle and the scatter is suppressed, whereby the available percentage of resin can be prevented from being worsened.

According to the ninth aspect of the present invention, the resin impregnation part stops the spraying by the resin injection nozzles before switched after starting the spraying by the resin injection nozzles after switched, whereby the resin spray injected from the resin spray nozzle at the upstream side is engulfed by the resin spray ejected from the resin spray nozzle at the downstream side and the scattering is suppressed. Since the sprayed resin flows along the outside peripheral face of the liner, scattering of resin can be suppressed, whereby the available percentage of resin can be prevented from being worsened.

BRIEF DESCRIPTION OF DRAWINGS

FIG. 6A is a front view of atomizing of resin with a conventional filament winding apparatus. FIG. 6B is a side view of atomizing of resin with the filament winding apparatus according to the first embodiment of the present invention.

FIG. 8A is a front view of atomizing of resin with the filament winding apparatus according to the second embodiment of the present invention. FIG. 8B is a side view of atomizing of resin with the filament winding apparatus according to the second embodiment of the present invention.

FIG. 13 It is a drawing of an embodiment of spraying of resin with the hoop winding device.

Figure 1:
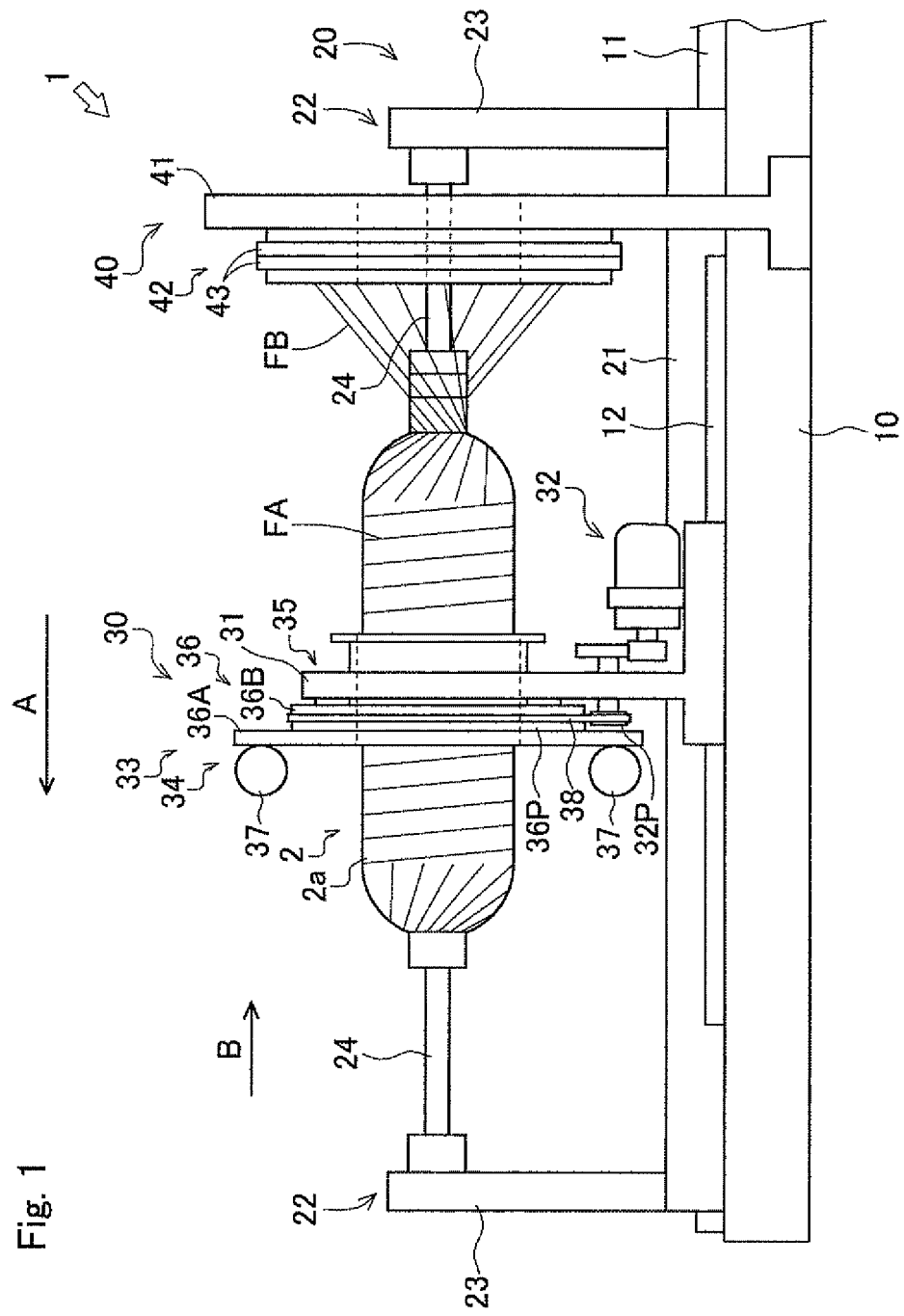
FIG. 1 It is a drawing of entire construction of a filament winding apparatus according to the present invention.

DESCRIPTION OF NOTATIONS 1 filament winding apparatus
2 liner
2a outside peripheral face
10 main pedestal
20 liner transfer device
30 hoop winding device
33 hoop mounting device
34 winding part
35 resin impregnation part
40 helical winding device
42 helical mounting device
43 helical winding head
44 fiber supply guide
45 resin supply nozzle
45N spray port
50 guide
51 guide member
52 guide support member
60 guide advancing/retracting mechanism
61 guide shaft
62 grooved cam
62a guide groove
70 guide rotating mechanism
71 transmission shaft
72 socket
73 face gear
80 nozzle main body
90 double tube nozzle
91 outer tube
92 inner tube
141 resin spray nozzle
141N spray port
FA fiber bundle FB fiber bundle
RS resin spray
VL1 imaginary line
VL2 imaginary line
VP imaginary plane

THE BEST MODE FOR CARRYING OUT THE INVENTION

Next, explanation will be given on the mode for carrying out the invention.

Firstly, explanation will be given on an entire construction of a filament winding apparatus 1 according to the present invention referring to FIG. 1.

FIG. 1 is a side view of the filament winding apparatus 1 according to the present invention. An arrow A in the drawing shows a transfer direction of a liner 2. The direction in parallel to the transfer direction of the liner 2 is regarded as the longitudinal direction, and the transfer direction of the liner 2 and the direction opposite thereto are respectively defined as the front side (the left side in the drawing) and the rear side (the right side in the drawing). The liner 2 moves reciprocally along the longitudinal direction of the filament winding apparatus 1, whereby the longitudinal direction is reversed when the liner 2 is transferred to the direction opposite to the transfer direction shown in FIG. 1.

The filament winding apparatus 1 winds fiber bundles FA and FB impregnated with resin round an outside peripheral face 2a of the liner 2 provided in the filament winding apparatus 1. The filament winding apparatus 1 mainly includes a main pedestal 10, a liner transfer device 20, a hoop winding device 30 and a helical winding device 40.

Round the outside peripheral face 2a of the liner 2, the fiber bundles FA and FB are wound with the filament winding apparatus 1. The liner 2 is for example a substantially cylindrical hollow container formed by a high strength aluminum, polyamide resin or the like, and the pressure resistance of the liner 2 is improved by winding the fiber bundles FA and FB round the outside peripheral face 2a. Namely, the liner 2 is a substrate constituting a pressure resistance hollow container.

The main pedestal 10 is a main structure of the filament winding apparatus 1. The liner transfer device 20 is mounted on a rail 11 for transferring the liner transfer device 20 provided in the upper portion of the main pedestal 10 so that the liner transfer device 20 is movable along the longitudinal direction of the filament winding apparatus 1. The hoop winding device 30 is mounted on a rail 12 for transferring the hoop winding device 30 provided in parallel to the rail 11 so that the hoop winding device 30 is movable along the longitudinal direction of the filament winding apparatus 1.

The liner transfer device 20 rotates the liner 2 and transfers the liner 2 along the longitudinal direction of the filament winding apparatus 1. The liner transfer device 20 mainly includes a transfer device pedestal 21, a transfer driving device (not shown) and liner support parts 22.

The transfer device pedestal 21 is a main structure of the liner transfer device 20. As mentioned above, the liner transfer device 20 is mounted on the rail 11 of the main pedestal 10 so as to be movable along the longitudinal direction by the transfer driving device. The pair of the liner support parts 22 is provided along the longitudinal direction in the transfer device pedestal 21, and the liner support parts 22 support the liner 2.

Concretely, each of the liner support parts 22 mainly includes a liner support frame 23 extended upward from the transfer device pedestal 21 and a rotational shaft part 24 extended longitudinally from the upper portion of the liner support frame 23. The liner 2 attached to the rotational shaft parts 24 respectively constituting the liner support parts 22 with chucks or the like is rotated along one direction by the rotational shaft parts 24.

According to the construction, the liner 2 is rotated so that the rotational axis of the liner 2 is in parallel to the longitudinal direction of the filament winding apparatus 1, and is transferred along the longitudinal direction of the filament winding apparatus 1.

The hoop winding device 30 winds the fiber bundle FA round the outside peripheral face 2a of the liner 2 so as to make the fiber bundle FA substantially perpendicular to the longitudinal direction of the filament winding apparatus 1, i.e., performs so-called hoop winding. The hoop winding device 30 mainly includes a hoop winding device pedestal 31, a transfer driving device (not shown), a rotation driving device 32 and a hoop mounting device 33.

The hoop winding device pedestal 31 is a main structure of the hoop winding device 30. As mentioned above, the hoop winding device 30 is mounted on the rail 12 of the main pedestal 10 so as to be movable along the longitudinal direction by the transfer driving device. The rotation driving device 32 and the hoop mounting device 33 are provided in the hoop winding device pedestal 31, and the rotation driving device 32 rotates the hoop mounting device 33 so as to wind the fiber bundle FA.

Concretely, the hoop mounting device 33 mainly includes a mounting table 36 winding a hoop and a bobbin 37 supplying the fiber bundle FA to the mounting table 36. A fiber supply guide 136 guiding the fiber bundle FA to the outside peripheral face 2a of the liner 2 and a guide roller 137 guiding the fiber bundle FA to the fiber supply guide 136 (see FIG. 10) are disposed within the mounting table 36.

In detail, the fiber supply guide 136 and the guide roller 137 are arranged in the mounting table 36, and resin is sprayed from a resin spray nozzle 141 discussed later to the fiber bundle FA guided by the fiber supply guide 136. Then, the hoop winding device 30 moves longitudinally the mounting table 36 while rotating the mounting table 36, whereby the fiber bundle FA impregnated with the resin as mentioned above is wound round the outside peripheral face 2a of the liner 2.

The helical winding device 40 winds the fiber bundle FB round the outside peripheral face 2a of the liner 2 so as to make a predetermined angle between the fiber bundle FB and the longitudinal direction of the filament winding apparatus 1, i.e., performs so-called helical winding. The helical winding device 40 mainly includes a helical winding device pedestal 41 and a helical mounting device 42.

The helical winding device pedestal 41 is a main structure of the helical winding device 40. The helical winding device 40 is fixed to the main pedestal 10. The helical mounting device 42 is provided in the helical winding device pedestal 41. The liner 2 provided in the liner transfer device 20 is transferred while rotated and passes through the helical mounting device 42 so that the fiber bundle FB is wound.

Concretely, the helical mounting device 42 mainly includes a helical winding head 43 performing the helical winding and a bobbin (not shown) supplying the fiber bundle FB to the helical winding head 43. The helical winding head 43 includes a plurality of fiber supply guides 44 guiding the fiber bundles FB to the outside peripheral face 2a of the liner 2 and a plurality of resin supply nozzles 45 spraying resin to the fiber bundles FB transferred from the fiber supply guides 44 to the liner 2 (see FIG. 2).

In detail, in the helical winding head 43, the fiber supply guides 44 are arranged radially around the locus of the liner 2 so that the distance between the outside peripheral face 2a of the liner 2 and each of the fiber supply guides 44 is equal. Resin is sprayed from the resin supply nozzles 45 to the fiber bundles FB guided by the fiber supply guides 44. The liner 2 provided in the liner transfer device 20 is transferred while rotated so that the fiber bundles FB impregnated with the resin as mentioned above are wound round the outside peripheral face 2a of the liner 2.

Explanation will be given on the helical winding device 40 of the filament winding apparatus 1 according to the present invention and the fiber supply guides 44 and the resin supply nozzles 45 constituting the helical winding device 40 in detail referring to FIGS. 2 and 3.

Figure 2:
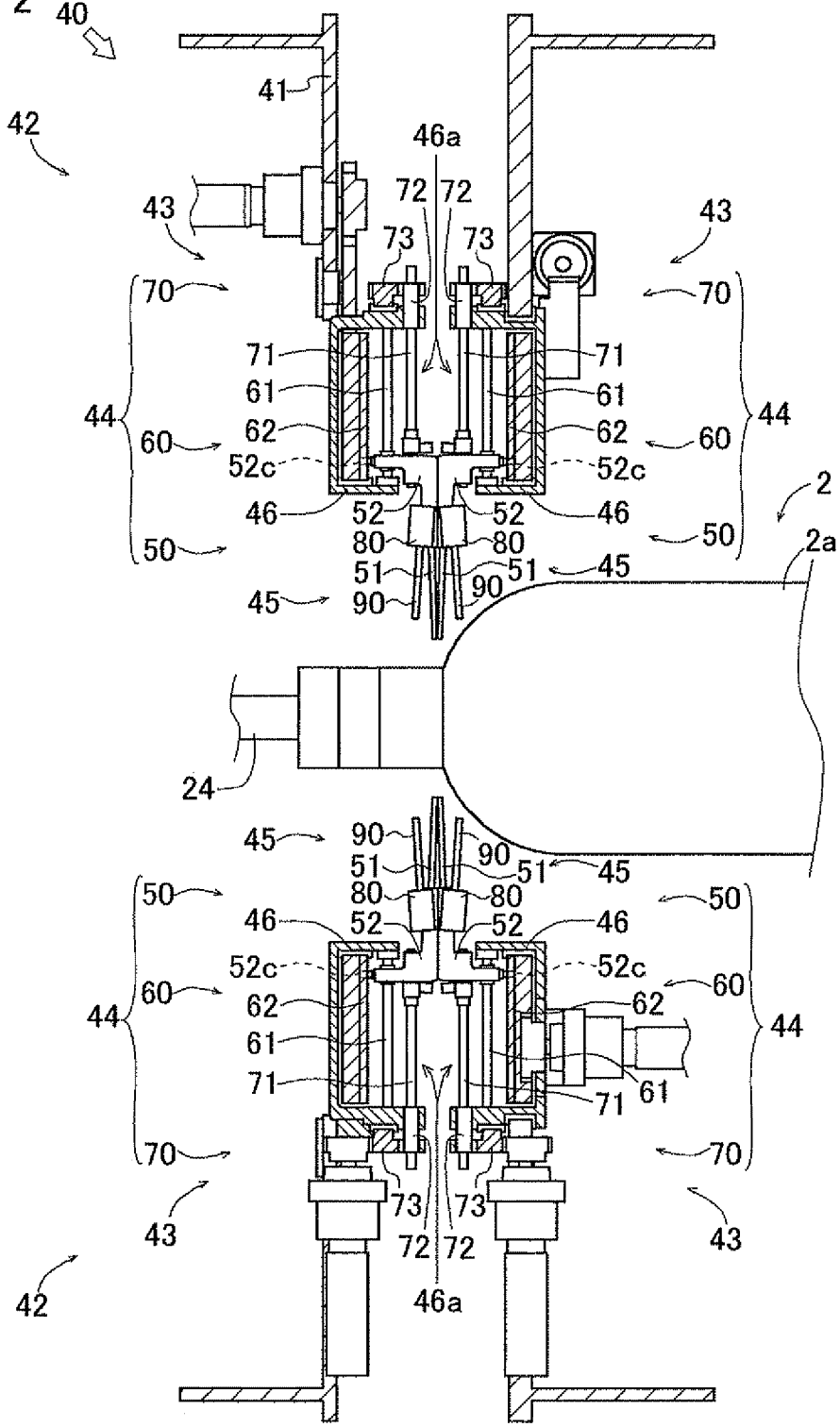
FIG. 2 It is a drawing of a helical winding device constituting the filament winding apparatus according to the present invention.
Figure 3:
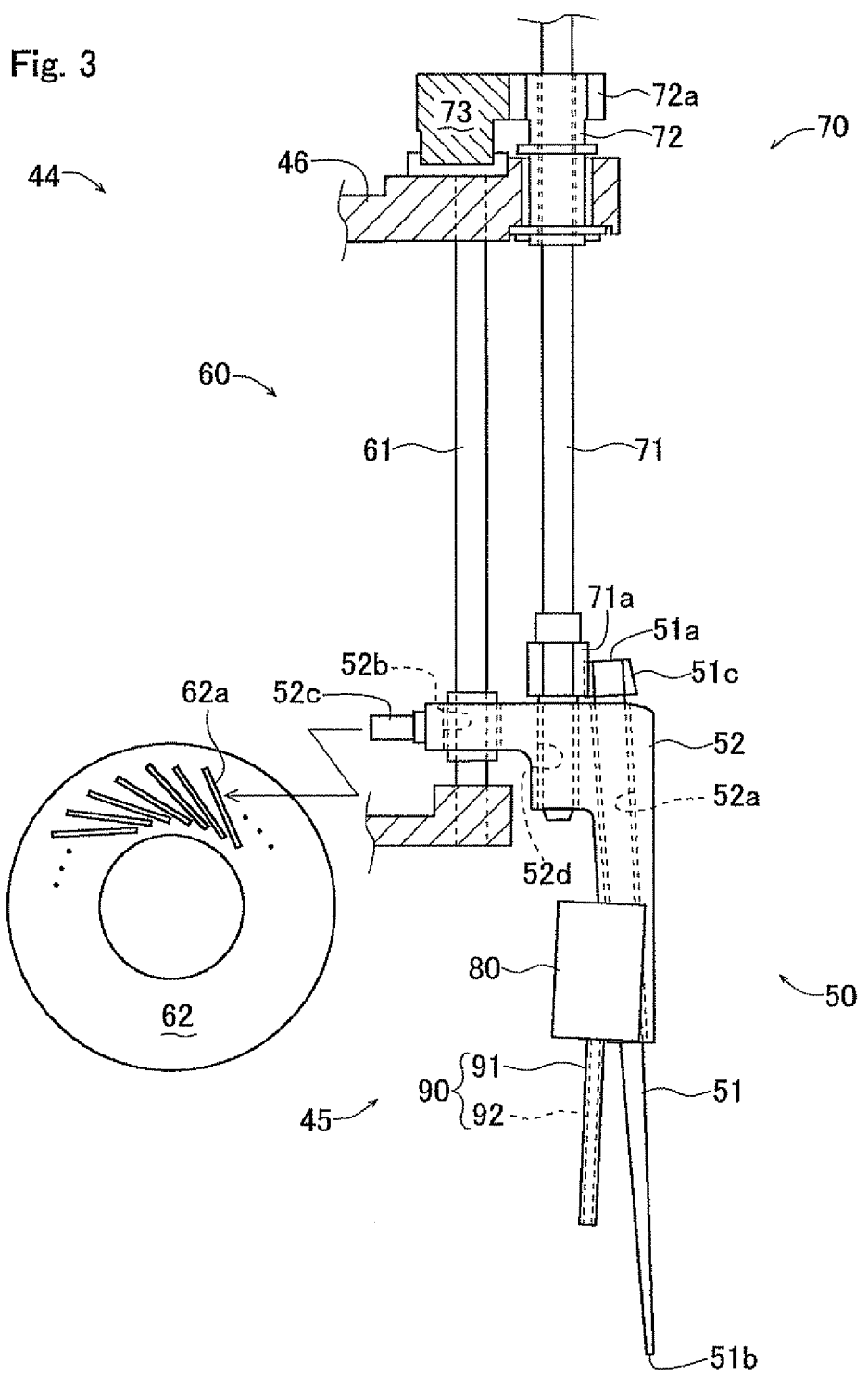
FIG. 3 It is a drawing of a fiber supply guide and a resin supply nozzle constituting the helical winding device.

FIG. 2 is a side view of the helical winding device 40 of the filament winding apparatus 1. FIG. 3 is a side view of the fiber supply guide 44 and the resin supply nozzle 45 constituting the helical winding device 40.

As mentioned above, the helical winding device 40 includes the helical winding device pedestal 41 which is the main structure and the helical mounting device 42 including the helical winding head 43 and the like. The fiber supply guide 44 provided in the helical winding head 43 guides the fiber bundle FB supplied from the bobbin (not shown) to the liner 2. The resin supply nozzle 45 sprays resin to the fiber bundle FB transferred from the fiber supply guides 44 to the liner 2.

Explanation will be given on the fiber supply guides 44 in detail referring to FIGS. 2 and 3. The fiber supply guides 44 mainly includes a guide 50, a guide advancing/retracting mechanism 60 and a guide rotating mechanism 70.

The guide 50 guides the fiber bundle FB supplied from the bobbin to the outside peripheral face 2a of the liner 2. The guide 50 mainly includes a guide member 51 substantially tapered and in which a guide passage for the fiber bundle FB is formed, and a guide support member 52 L-like shaped when viewed in side and into which the guide member 51 is inserted.

A guide passage is formed which penetrates the guide member 51 from an inlet 51a which is one of the ends of the guide member 51 to an outlet 51b which is the other end thereof so as to guide the fiber bundle FB supplied from the bobbin to the outside peripheral face 2a of the liner 2. The outlet 51b of the guide member 51 is formed substantially ellipsoidal so as to make the supply of the fiber bundle FB smooth.

A tapered through-hole 52a is formed in the guide support member 52, and the guide member 51 is inserted into the through-hole 52a and is supported rotatably centering around the axis.

According to the construction, the fiber bundle FB supplied from the bobbin is guided by the guide member 51 supported by the guide support member 52 and then wound round the outside peripheral face 2a of the liner 2.

The guide advancing/retracting mechanism 60 moves the guide 50 so as to make the guide 50 advance/retract about the outside peripheral face 2a of the liner 2. The guide advancing/retracting mechanism 60 mainly includes a guide shaft 61 inserted into a through-hole 52b provided in the guide support member 52 so as to make the guide support member 52 movable along the axial direction, and a circular grooved cam 62 in which a guide groove 62a guiding the guide support member 52 is bored.

The axis of the guide shaft 61 is perpendicular to the rotational axis of the liner 2, and each of the ends of the guide shaft 61 is fixed to a circular member 46 C-like shaped when viewed in section and coaxial to the rotational axis of the liner 2.

The rotational axis of the grooved cam 62 is coaxial to the rotational axis of the liner 2, and the grooved cam 62 is provided inside a recess 46a of the circular member 46. The guide groove 62a whose locus is changed in the diametral direction following the rotation is bored in one of the surfaces of the grooved cam 62, and a projection part 52c of the guide support member 52 projected in parallel to the longitudinal direction is inserted into the guide groove 62a.

Figure 4:
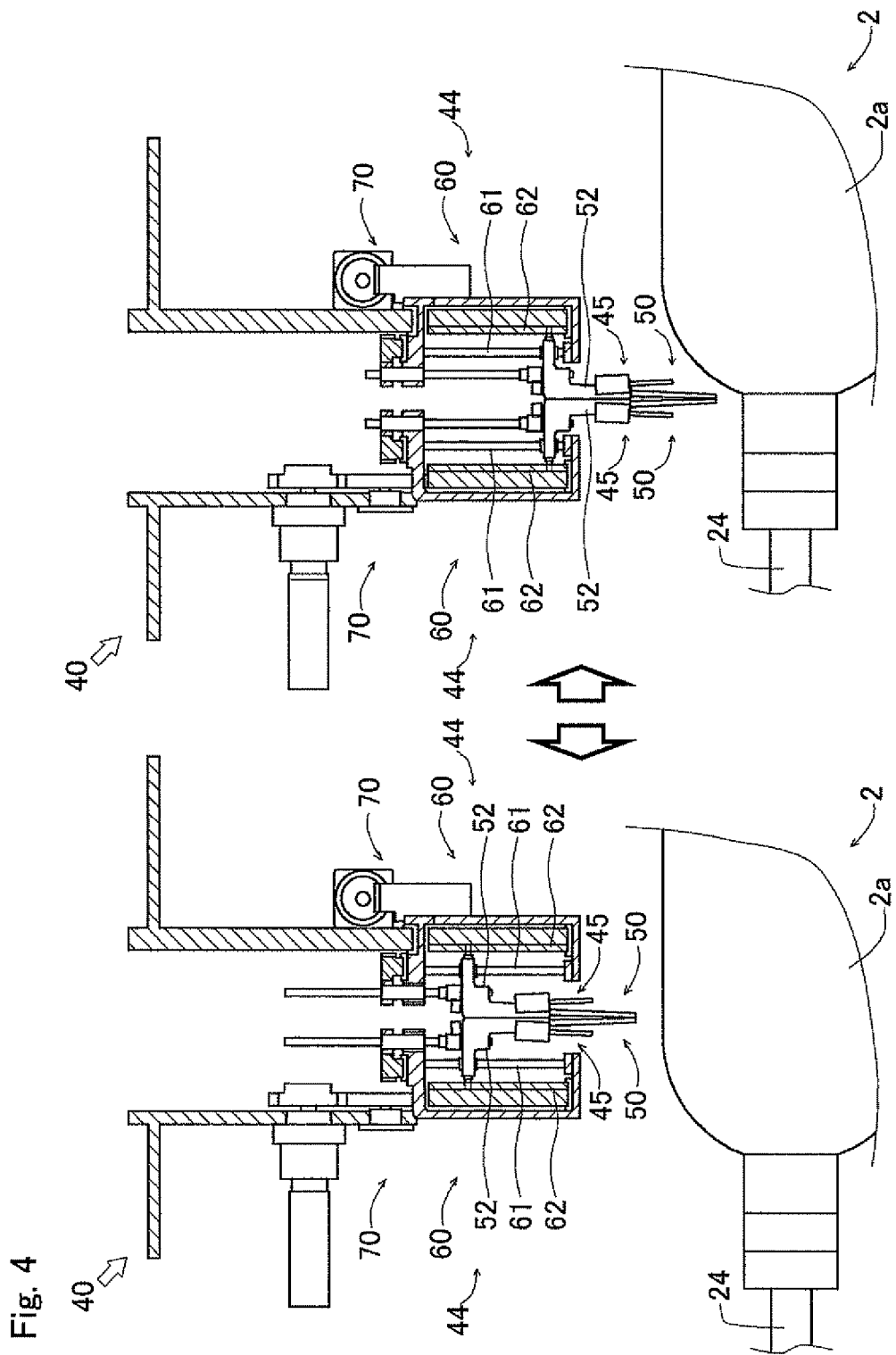
FIG. 4 It is a drawing of action of movement of the fiber supply guide and the resin supply nozzle along an outside diameter of a liner.

According to the construction, as shown in FIG. 4, the guide 50 can advance/retract about the outside peripheral face 2a of the liner 2. Namely, by rotating the grooved cam 62 following the outer diameter of the liner 2, the guide support member 52 can be guided to the guide groove 62a of the grooved cam 62, whereby the guide 50 can be moved along the axial direction of the guide shaft 61.

The guide rotating mechanism 70 rotates the guide member 51 centering around the axial direction of the guide member 51. The guide rotating mechanism 70 mainly includes a transmission shaft 71 inserted into a through-hole 52d provided in the guide support member 52 and supported rotatably centering around the axial direction, a socket 72 formed substantially cylindrical and to which a spline shaft part formed at one of the ends of the transmission shaft 71 is inserted, and a circular face gear 73.

The transmission shaft 71 is arranged in parallel to the guide shaft 61 constituting the guide advancing/retracting mechanism 60 while the axis of the transmission shaft 71 is perpendicular to the rotational axis of the liner 2. One of the ends of the transmission shaft 71 is rotatably inserted into the through-hole 52d of the guide support member 52, and the other end at which the spline shaft part is formed is inserted into the socket 72. A driving gear 71a is formed at the middle of the transmission shaft 71 so as to mesh with a driven gear 51c provided in one of the ends of the guide member 51.

A spline hole is formed in the socket 72 along the axial direction thereof, and the spline shaft part of the transmission shaft 71 is inserted into the spline hole as mentioned above. The socket 72 is rotatably supported centering around the axial direction thereof by the circular member 46 which is arranged coaxially to the rotational axis of the liner 2.

The rotational axis of the face gear 73 is coaxial to the rotational axis of the liner 2, and the face gear 73 is rotatably engaged with the outer perimeter of the circular member 46. The gear part of the face gear 73 meshes with a driven gear 72a provided at one of the ends of the socket 72.

According to the construction, the guide member 51 can be rotated centering around the axis of the guide member 51. Namely, by rotating the face gear 73, the guide member 51 can be rotated via the socket 72 and the transmission shaft 71, whereby the guide member 51 can be prevented from touching another guide member 51 even if the guide member 51 is made close to the liner 2.

Next, explanation will be given on the resin supply nozzle 45 in detail referring to FIGS. 2 and 3. The resin supply nozzle 45 mainly includes a nozzle main body 80 and a double tube nozzle 90.

The nozzle main body 80 is a main structure of the resin supply nozzle 45, and is attached to the side of the guide support member 52 constituting the fiber supply guides 44 in the filament winding apparatus 1 according to the present invention. The nozzle main body 80 is connected through valves or the like to an air tank and a resin tank (not shown).

The double tube nozzle 90 includes a cylindrical outer tube 91 and a cylindrical inner tube 92 provided inside the outer tube 91, and sprays resin to the fiber bundle FB transferred from the guide member 51 of the fiber supply guides 44 to the liner 2.

The cylindrical outer tube 91 constituting the double tube nozzle 90 is an air nozzle ejecting air supplied from the air tank, and the inner tube 92 is a resin nozzle ejecting resin supplied from the resin tank. Namely, the air supplied from the air tank is ejected from a gap between the cylindrical outer tube 91 and the inner tube 92, and the resin supplied from the resin tank is ejected from the inner tube 92.

According to the construction, resin with comparative high specific gravity and high viscosity can be ejected stably by an air jet. Therefore, the resin can be sprayed to the fiber bundle FB transferred to the liner 2 and influence of gravity on the resin spraying characteristic of the resin supply nozzle 45 can be reduced.

In the filament winding apparatus 1 according to the present invention, the nozzle main body 80 is attached to the side of the guide support member 52. However, the attached position thereof is not limited to the above while it is moved integrally with the guide 50.

Explanation will be given on the reason how the helical winding device 40 can prevent available percentage of resin from being worsened in the filament winding apparatus 1 constructed as mentioned above.

Figure 5:
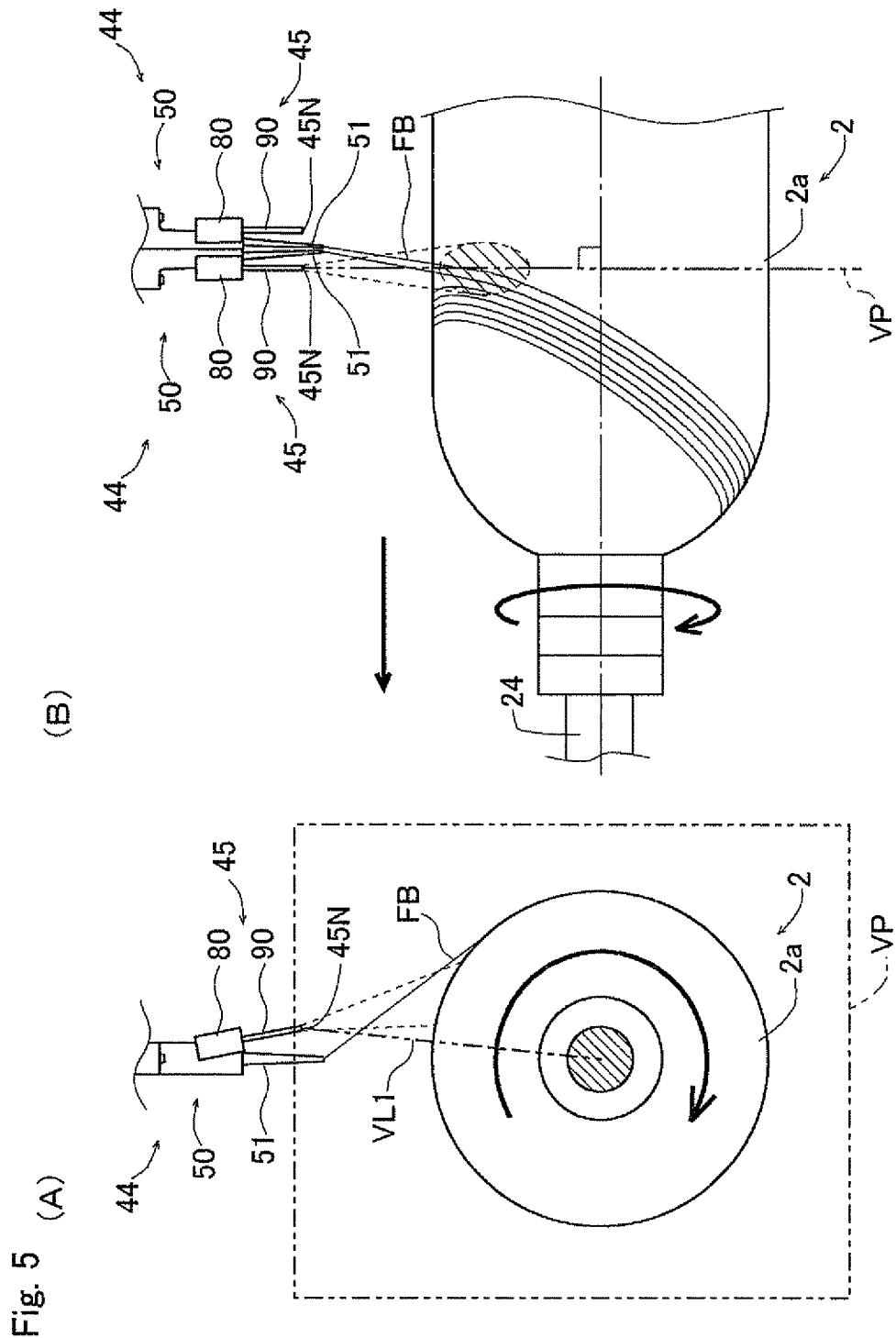
FIG. 5A is a front view of spraying of resin with the filament winding apparatus according to a first embodiment of the present invention.
FIG. 5B is a side view of spraying of resin with the filament winding apparatus according to the first embodiment of the present invention.

FIG. 5A is a front view of spraying of resin with the filament winding apparatus 1 according to a first embodiment of the present invention. FIG. 513 is a side view thereof. Arrows in the drawing show the transfer direction and rotation direction of the liner 2.

In this embodiment, the resin supply nozzle 45 spraying resin to the fiber bundle FB sprays resin to the side downstream in the rotational direction of the liner 2 (the clockwise direction in the drawing) about an imaginary line VIA determined by a straight line connecting a spray port 45N of the resin supply nozzle 45 to the rotational axis of the liner 2 (see FIG. 5A), and in parallel to an imaginary plane VP determined by a plane perpendicular to the transfer direction of the liner 2 (see FIG. 5B).

As shown in FIGS. 5A and 5B, the fiber bundle FB transferred from the guide member 51 of the fiber supply guides 44 to the liner 2 is extended to the downstream side in the rotational direction of the liner 2 and to the front side of the liner 2 by the liner 2 transferred to the front side of the filament winding apparatus 1 when viewed in side while rotated clockwise when viewed in front so as to be wound round the outside peripheral face 2a of the liner 2.

Accordingly, the fiber bundle FB extended between the guide member 51 and the liner 2 is transferred to the liner 2 while passing through resin spray RS sprayed from the resin supply nozzle 45, whereby impregnation of the fiber bundle FB with the resin can be performed fine (see FIG. 6B).

As shown in FIG. 6A, in another mode of spraying resin, the resin spray RS collides with the outside peripheral face 2a of the liner 2, whereby scattering of the resin is caused. However, as shown in FIG. 613, in the filament winding apparatus 1 according to this embodiment, the resin spray RS reaches the outside peripheral face 2a of the liner 2 and then flow along the outside peripheral face 2a, whereby scattering of the resin can be suppressed. Therefore, the available percentage caused by the scattering of resin can be prevented from being worsened.

Figure 7:
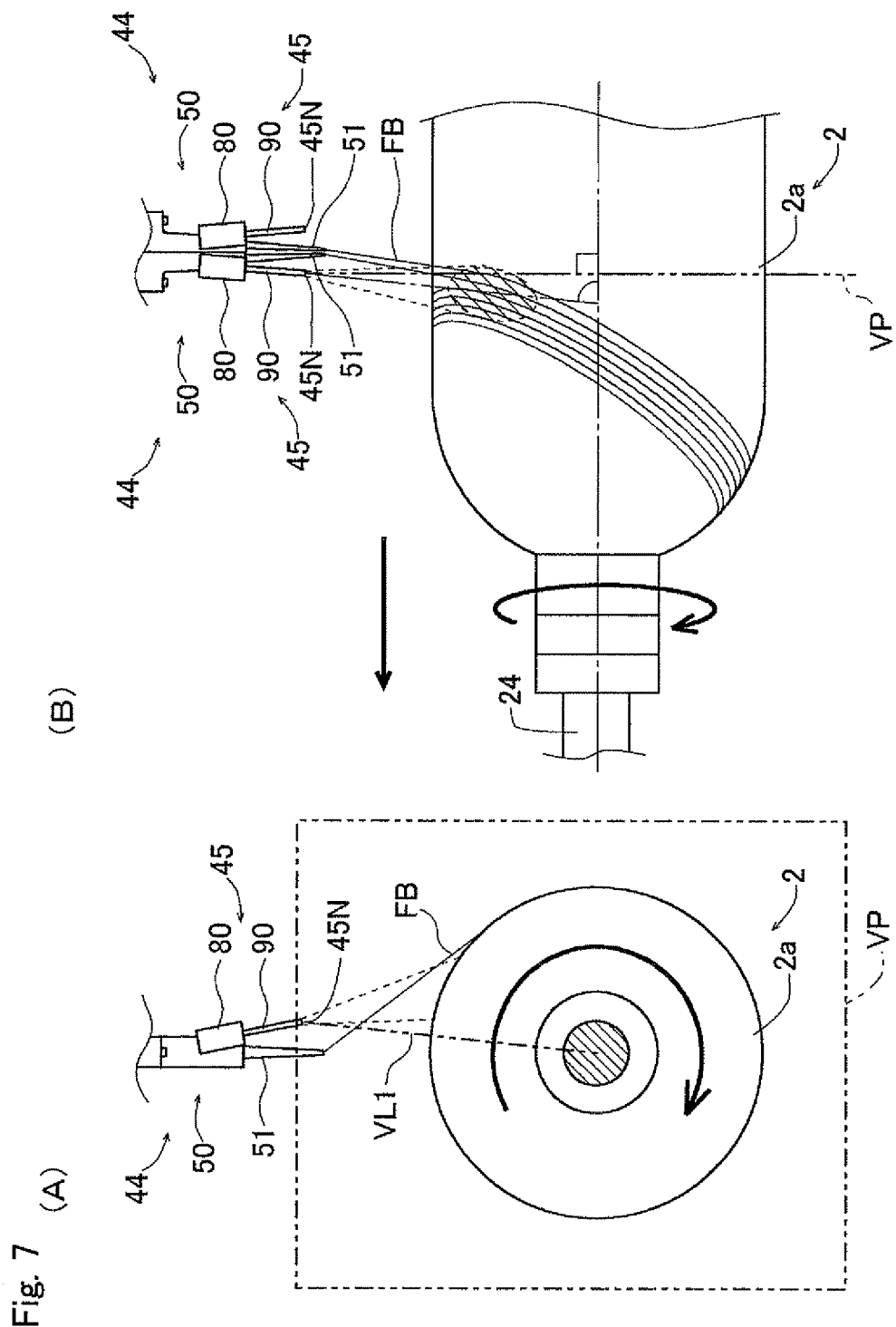
FIG. 7A is a front view of spraying of resin with the filament winding apparatus according to a second embodiment of the present invention.
FIG. 7B is a side view of spraying of resin with the filament winding apparatus according to the second embodiment of the present invention.

FIG. 7A is a front view of spraying of resin with the filament winding apparatus 1 according to a second embodiment of the present invention. FIG. 7B is a side view thereof. Arrows in the drawing show the transfer direction and rotation direction of the liner 2.

In this embodiment, the resin supply nozzle 45 spraying resin to the fiber bundle FB sprays resin to the side downstream in the rotational direction of the liner 2 (the clockwise direction in the drawing) about the imaginary line VL1 determined by a straight line connecting the spray port 45N of the resin supply nozzle 45 to the rotational axis of the liner 2 (see FIG. 7A), and to the front side of the liner 2 about the imaginary plane VP determined by a plane perpendicular to the transfer direction of the liner 2 and crossing the spray port 45N (see FIG. 7B).

As mentioned above, the fiber bundle FB transferred from the guide member 51 of the fiber supply guides 44 to the liner 2 is extended to the downstream side in the rotational direction of the liner 2 and to the front side of the liner 2.

Accordingly, the fiber bundle FB extended between the guide member 51 and the liner 2 is transferred to the liner 2 while passing through resin spray RS sprayed from the resin supply nozzle 45, whereby impregnation of the fiber bundle FB with the resin can be performed fine (see FIG. 8A).

As shown in FIGS. 8A and 8B, the resin spray RS reaches the outside peripheral face 2a of the liner 2 and then flow along the outside peripheral face 2a, whereby scattering of the resin caused by collision of the resin spray RS with the outside peripheral face 2a of the liner 2 can be suppressed. Therefore, the available percentage caused by the scattering of resin can be prevented from being worsened.

The resin spray RS flowing along the outside peripheral face 2a of the liner 2 flows helically toward the front side of the liner 2 (see an arrow of a broken line in FIG. 8B) by an adjoint air current caused by the rotation of the liner 2 (see an arrow of a broken line in FIG. 8A), whereby the fiber bundle FB after wound round the liner 2 can be impregnated with the resin further.

Each of the resin sprays RS formed by injected from the resin supply nozzles 45 arranged radially flows helically and cooperatively with each other without obstructing the flows of the other resin sprays RS, whereby the fiber bundle FB after wound round the liner 2 can be impregnated with the resin uniformly.

As an example of spraying of resin with the filament winding apparatus 1 according to the present invention, a construction is given in which the resin supply nozzle 45 is arranged so as to make the spraying direction of resin parallel to or substantially parallel to the transfer direction of the fiber bundle FB before wound round the liner 2, that is, the resin spray RS formed by injected from the resin supply nozzle 45 is made along the fiber bundle FB.

Accordingly, the fiber bundle FB passes through the resin spray RS along the resin spray RS toward the liner 2, whereby impregnation with the resin can be performed better. Scattering of the resin caused by collision of the resin spray RS with the outside peripheral face 2a of the liner 2 can be suppressed, whereby the available percentage can be prevented from being worsened. Furthermore, the resin spray RS flows helically toward the front side of the liner 2, whereby the fiber bundle FB after wound round the liner 2 can be impregnated with the resin uniformly.

Next, explanation will be given on the embodiment of spraying of resin in the case in which the outside diameter of the liner 2 is changed in the filament winding apparatus 1 according to the present invention.

As mentioned above, in the filament winding apparatus 1 according to the present invention, the guide advancing/retracting mechanism 60 constituting the fiber supply guide 44 makes the guide 50 advance/retract about the outside peripheral face 2a of the liner 2 (see FIG. 4).

When the outside diameter of the liner 2 is changed in the winding position of the fiber bundle FB in the liner 2, the distance between the outside peripheral face 2a and the guide member 51 may be changed so as to affect the tension of the fiber bundle FB. Therefore, the guide 50 is moved so as to stabilize the tension.

The resin supply nozzle 45 spraying resin to the fiber bundle FB is attached to the side of the guide support member 52 constituting the guide 50, thereby being moved integrally with the guide 50.

Accordingly, even if the outside diameter of the liner 2 is changed, the distance between the resin supply nozzle 45 and the liner 2 can be controlled suitably, whereby impregnation of the fiber bundle FB with the resin can be performed fine.

For example, it may alternatively be constructed that an actuator changing the spraying direction of resin with the resin supply nozzle 45 so that the spraying direction of resin can be changed suitably corresponding to the change of the outside diameter of the liner 2 and the winding angle of the fiber bundle FB. Accordingly, even if the outside diameter of the liner 2 or the winding angle of the fiber bundle FB is changed, the resin can be sprayed to the fiber bundle FB stably, whereby impregnation of the fiber bundle FB with the resin can be performed fine.

Furthermore, in the filament winding apparatus 1 according to the present invention, the helical winding heads 43 are provided parallel in the longitudinal direction of the filament winding apparatus 1 (see FIG. 2), whereby resin can be sprayed simultaneously from the resin supply nozzles 45 respectively provided in the helical winding heads 43.

Figure 9:
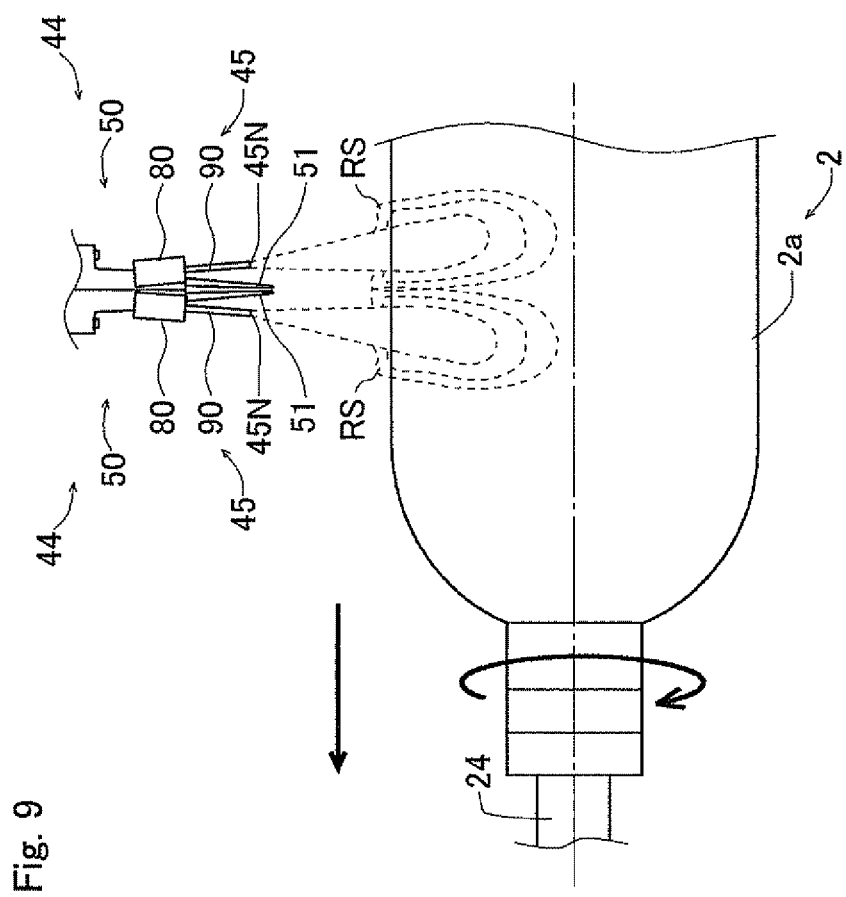
FIG. 9 It is a drawing of complementary spraying of resin from a second resin supply nozzle to a fiber bundle.

As shown in FIG. 9, it may alternatively be constructed that the first resin supply nozzle 45 at the front side of the filament winding apparatus 1 sprays resin mainly and the second resin supply nozzle 45 at the rear side of the filament winding apparatus 1 sprays resin complementarily.

The rotational speed of the liner 2 rotated by the liner transfer device 20 is always fixed. Therefore, when the winding speed of the fiber bundle FB is changed following the change of the outside diameter of the liner 2 or the transfer speed of the liner 2, the spraying amount of the resin must be controlled suitably.

Accordingly, for example, when the winding speed of the fiber bundle FB is increased, the second resin supply nozzle 45 sprays resin complementarily, and when the winding speed of the fiber bundle FB is reduced, spraying of resin by the second resin supply nozzle 45 is stopped, whereby impregnation of the fiber bundle FB with the resin can be performed fine.

Next, explanation will be given on the reason how the hoop winding device 30 can prevent available percentage of resin from being worsened in the filament winding apparatus 1.

Figure 10:
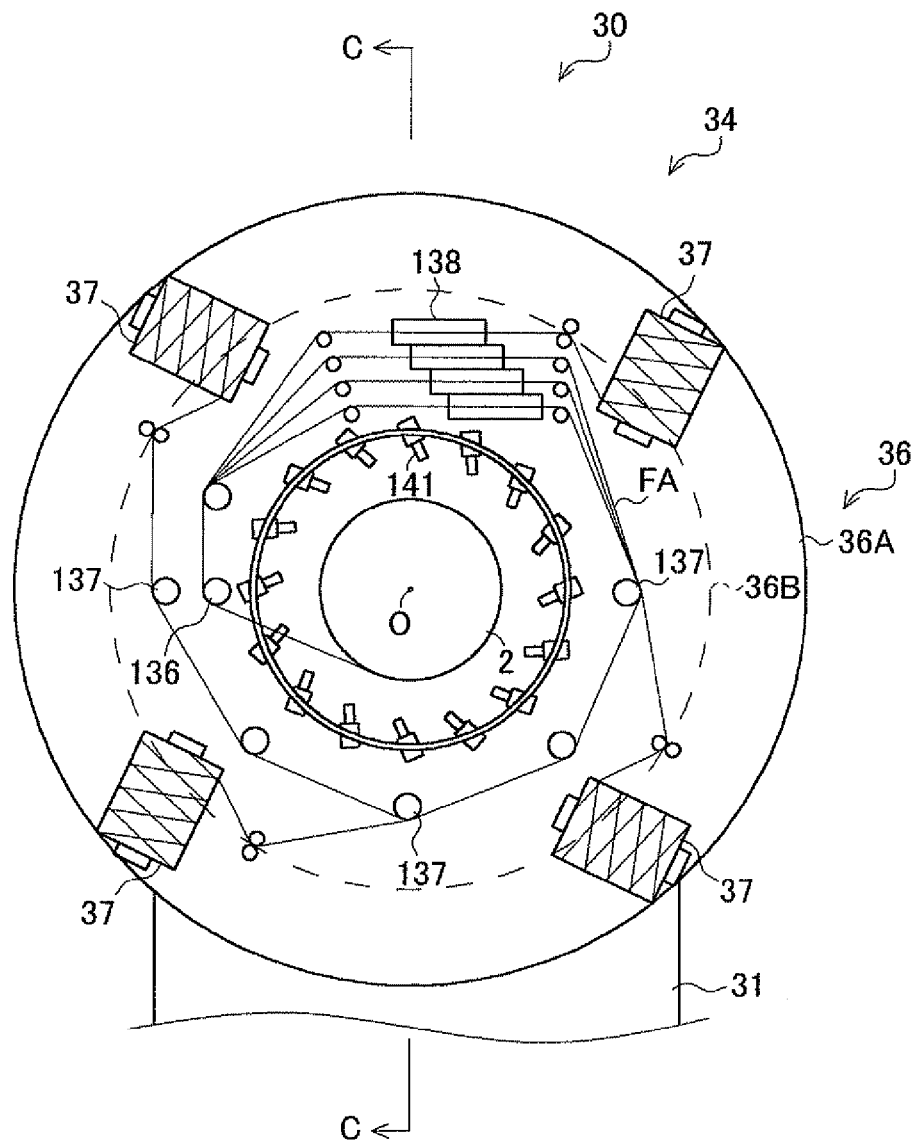
FIG. 10 It is an arrow front view of an arrow B in FIG. 1 of a hoop winding device.
Figure 11:
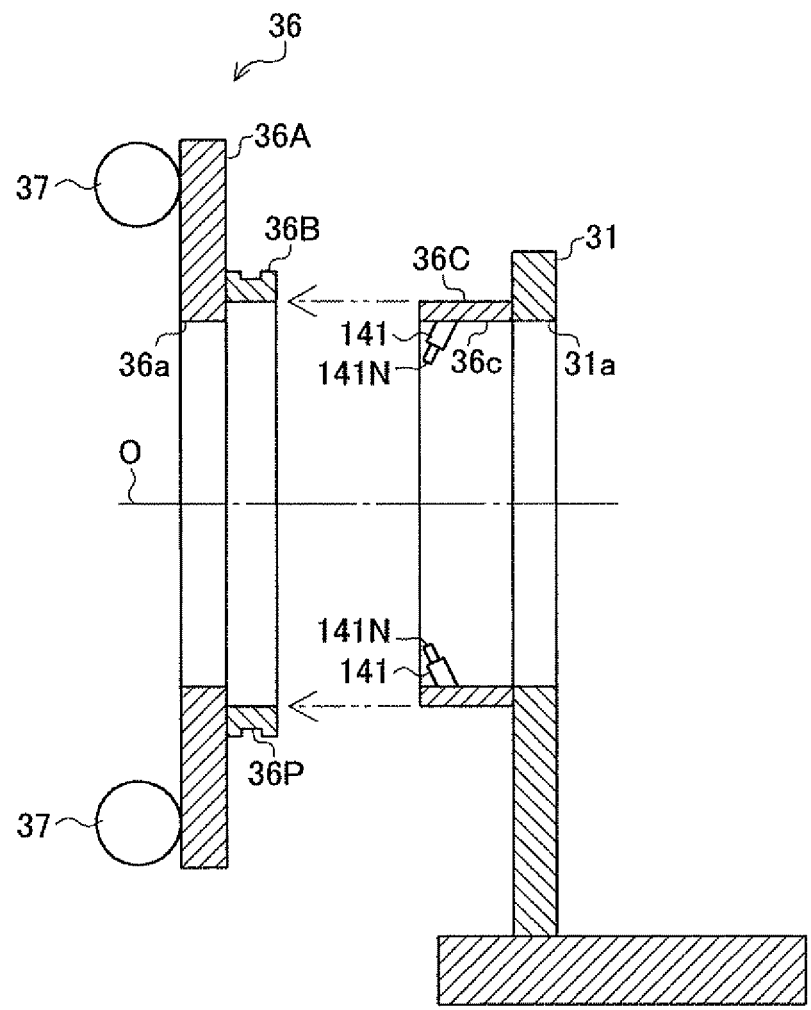
FIG. 11 It is an arrow sectional view of a line C-C in FIG. 10.

FIG. 10 is an arrow front view of an arrow B in FIG. 1 of the hoop winding device 30. FIG. 11 is an arrow sectional view of a line C-C in FIG. 10 of the hoop winding device 30.

As mentioned above, the hoop winding device 30 winds the fiber bundle FA round the outside peripheral face 2a of the liner 2 so as to make the fiber bundle FA substantially perpendicular to the longitudinal direction of the filament winding apparatus 1, i.e., performs so-called hoop winding. The hoop winding device 30 includes a winding part 34 and a resin impregnation part 35.

The winding part 34 rotates the fiber bundle FA about the liner 2 and winds the fiber bundle FA round the outside peripheral face 2a of the liner 2. The mounting table 36 constituting the winding part 34 is supported rotatably about the hoop winding device pedestal 31. The mounting table 36 includes a table main body 36A and an outer ring part 36B.

A first insertion hole 36a to which the liner 2 can be inserted is formed in the table main body 36A. The liner 2 is inserted so as to make the axis O thereof in agreement with the center of the first insertion hole 36a (the center of the mounting table 36) and then stopped at this state. In the table main body 36A, the fiber supply guide 136 guiding the fiber bundle FA supplied from the bobbin 37 to the outside peripheral face 2a of the liner 2 and the plurality of the guide rollers 137 guiding the fiber bundle FA from the bobbin 37 to the fiber supply guide 136.

The fiber supply guide 136 guides the plurality of the fiber bundles FA closely and in parallel to each other along the outside peripheral face 2a of the liner 2. A yarn tensioner 138 applies a predetermined tension on each of the fiber bundles FA and is arranged on the route of the fiber bundles FA. The outer ring part 36B is fixed to the side of the table main body 36A and is rotatably supported about the hoop winding device pedestal 31 via a bearing (not shown).

A second insertion hole 31a to which the liner 2 can be inserted is formed in the hoop winding device pedestal 31. A third insertion hole 36c to which the liner 2 can be inserted is formed in an inner ring part 36C. The inner ring part 36C is fixed to the side surface of the hoop winding device pedestal 31 so that the third insertion hole 36c is communicated with the second insertion hole 31a of the hoop winding device pedestal 31.

The outer ring part 36B is rotatably supported by the inner ring part 36C so that the mounting table 36 is rotatably supported about the hoop winding device pedestal 31. A first pulley 36P is formed in the outer perimeter of the outer ring part 3613, and a belt 38 is wound between the first pulley 36P and a second pulley 32P of the rotation driving device 32. Accordingly, by rotating the mounting table 36 by the rotation driving device 32, the fiber bundle FA is wound.

Figure 12:
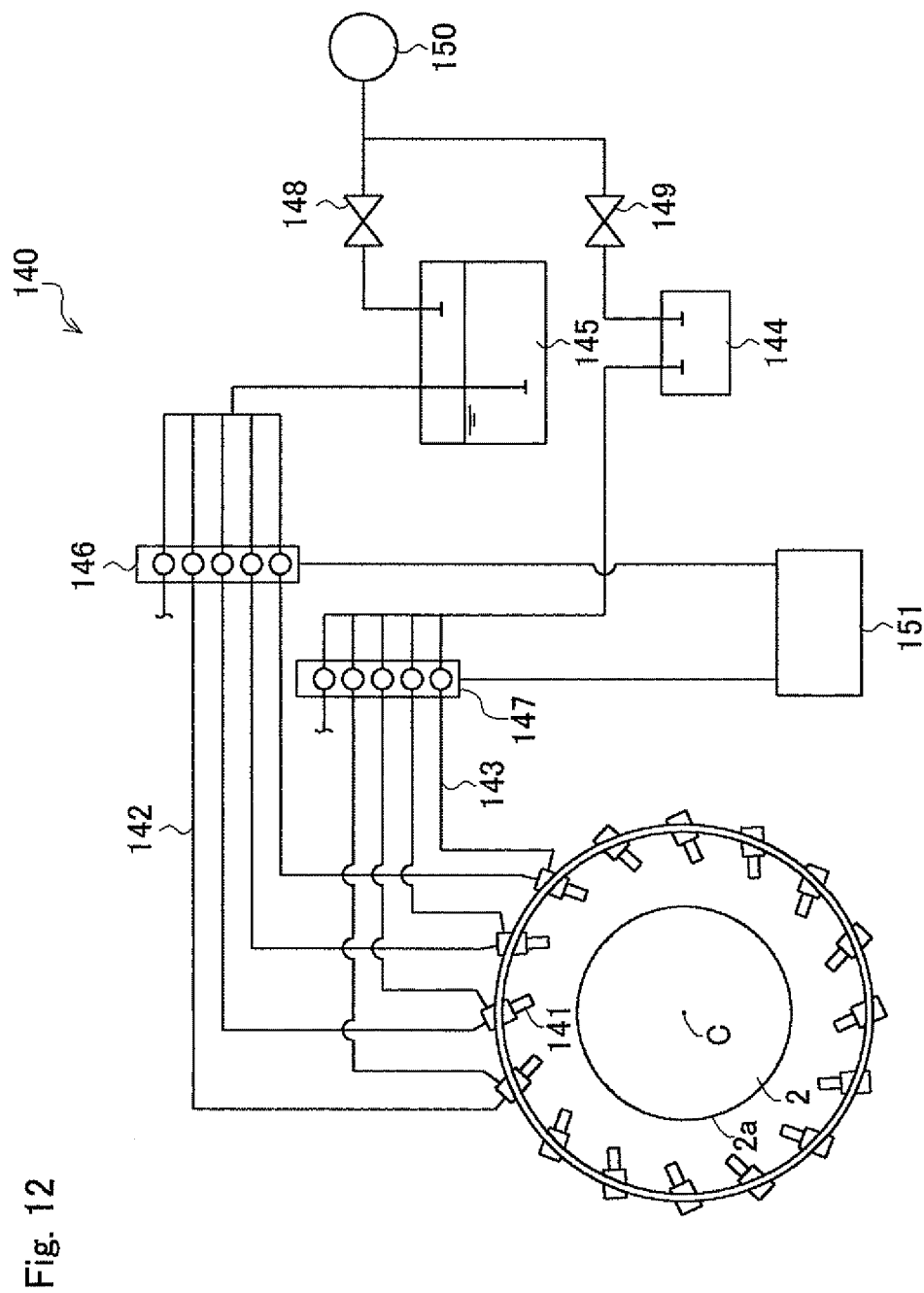
FIG. 12 It is a drawing of piping of a resin impregnation part.

FIG. 12 is a drawing of piping of the resin impregnation part 35.

The resin impregnation part 35 sprays resin to the fiber bundle FA before wound round the liner 2. As shown in FIG. 11, the plurality of the resin spray nozzles 141 spraying resin are arranged radially inside the inner ring part 36C fixed to the hoop winding device pedestal 31 so as to surround the liner 2.

As shown in FIG. 12, each of the resin spray nozzles 141 is connected to a resin supply tube 142 and an air supply tube 143. The resin supply tube 142 is connected via an electromagnetic resin valve 146 to a resin tank 145. The air supply tube 143 is connected via an electromagnetic air valve 147 to an air tank 144. The resin tank 145a and the air tank 144 are connected to a compressor 150 respectively via a resin valve 148 and an air valve 149 which are operated manually.

Furthermore, the electromagnetic resin valve 146 which opens/closes the resin supply tube 142 of the resin spray nozzle 141 and the electromagnetic air valve 147 which opens/closes the air supply tube 143 of the resin spray nozzle 141 are connected to a control part 151. The control part 151 forms a control signal so as to open/close each of the electromagnetic resin valves 146 and the electromagnetic air valves 147 separately. The control part 151 is connected to a detection means (not shown) such as an encoder which detects positions such as the rotational angle of the mounting table 36.

The control part 151 specifies the position of the fiber bundle FA to be wound round the liner 2 by detecting the positions such as the rotational angle of the mounting table 36. The control part 151 selects one or more resin spray nozzles 141 which can spray resin to the fiber bundle FA at the specified position before wound round the liner 2. Then, the control part 151 operates the electromagnetic resin valves 146 and the electromagnetic air valves 147 corresponding to the selected resin spray nozzles 141 so as to supply resin and air to the selected resin spray nozzles 141.

Accordingly, the control part 151 specifies the position of the fiber bundle FA and actuates the resin spray nozzles 141 corresponding to the position of the fiber bundle FA so as to switch the resin spray nozzles 141 spraying resin synchronously with the rotation of the fiber bundle FA.

The resin spray nozzle 141 is a double tube nozzle which has an outer tube (not shown) and an inner tube (not shown). A spray port 141N includes the openings of the outer tube and the inner tube. The outer tube is an air nozzle connected to the air supply tube 143 and ejects air, and the inner tube is a resin nozzle connected to the resin supply tube 142 and ejects resin. Namely, air supplied from the air tank 144 is ejected from a gap between the outer tube and the inner tube, and the resin supplied from the resin tank 145 is ejected from the inner tube.

According to the construction, the resin spray nozzle 141 can spray resin with comparative high specific gravity and high viscosity to the fiber bundle FA transferred from the fiber supply guide 136 toward the liner 2.

FIG. 13 is a drawing of spraying of resin with the hoop winding device 30.

As shown in FIG. 13, the resin spray nozzle 141 sprays resin to the downstream side in the rotational direction of the fiber bundle FA (the clockwise direction in the drawing) about an imaginary line VL2 determined by a straight line connecting the spray port 141N to the axis O of the liner 2. The fiber bundle FA guided from the fiber supply guide 136 to the liner 2 is wound round the outside peripheral face 2a of the liner 2 while rotated clockwise when viewed in front so as to be extended toward the downstream side in the rotational direction of the mounting table 36.

Accordingly, the fiber bundle FA extended between the fiber supply guide 136 and the liner 2 is transferred to the liner 2 along the resin spray RS formed by injection from the resin spray nozzle 141, whereby impregnation of the fiber bundle FA with the resin can be performed fine.

As shown in FIGS. 13A to 13C, by rotating the fiber bundle FA by the rotation of the mounting table 36, the fiber bundle FA is wound round the outside peripheral face 2a of the stopped liner 2. At this time, the control part 151 specifies the position of the fiber bundle FA to be wound round the liner 2 and selects one or more resin spray nozzles 141 which can spray resin to the fiber bundle FA at the specified position before wound round the liner 2. Then, the control part 151 operates the electromagnetic resin valves 146 and the electromagnetic air valves 147 corresponding to the selected resin spray nozzles 141.

At the state of FIG. 13A, the control part 151 selects and operates a resin spray nozzle 141a corresponding to the position of the fiber bundle FA. However, at the state of FIG. 13B, the control part 151 selects and operates a next resin spray nozzle 141b corresponding to the rotation of the fiber bundle FA and stops the resin spray nozzle 141a. At the state of FIG. 13C, the control part 151 selects and operates a next resin spray nozzle 141c and stops the resin spray nozzle 141b.

Accordingly, the control part 151 specifies the position of the fiber bundle FA and actuates the resin spray nozzles 141 corresponding to the position of the fiber bundle FA so as to switch the resin spray nozzles 141 spraying resin synchronously with the rotation of the fiber bundle FA.

Accordingly, resin is sprayed to the fiber bundle FA from the one or more resin spray nozzles 141 and the resin spray nozzles 141 spraying resin is switched synchronously with the rotation of the fiber bundle FA, whereby impregnation of the fiber bundle FB with the resin can be performed without spraying resin uselessly. The resin colliding with the liner 2 and scattering is engulfed by the resin spray RS ejected from the next resin spray nozzle 141 and the scatter is suppressed, whereby the available percentage of resin can be prevented from being worsened.

As shown in FIG. 13, the resin spray nozzle 141 in this embodiment sprays resin to the downstream side in the rotational direction of the fiber bundle FA (the clockwise direction in the drawing) about the imaginary line VL2 connecting the spray port 141N to the axis O of the liner 2, whereby the resin is sprayed aslant about the liner 2 and the resin spray RS flows along the outside peripheral face 2a. Accordingly, scattering of resin caused by the resin sprayed to the fiber bundle FA, colliding with the liner 2 and bouncing can be suppressed, whereby the available percentage of resin can be prevented from being worsened.

Accordingly, the hoop winding device 30 sprays resin while the resin spray nozzles 141 spraying the resin is switched synchronously with the rotation of the fiber bundle FA guided by the fiber supply guide 136. The fiber bundle FA impregnated with resin is wound round the outside peripheral face 2a of the liner 2 by the longitudinal movement of the hoop winding device 30 while rotating the mounting table 36.

Accordingly, the filament winding apparatus 1 forms a first hoop winding layer with the hoop winding device 30 and then forms a second hoop winding layer by moving the hoop winding device 30 reversely. When the hoop winding layers are formed further, the hoop winding device 30 is moved reciprocally so as to perform the hoop winding with the required count.

Figure 14:
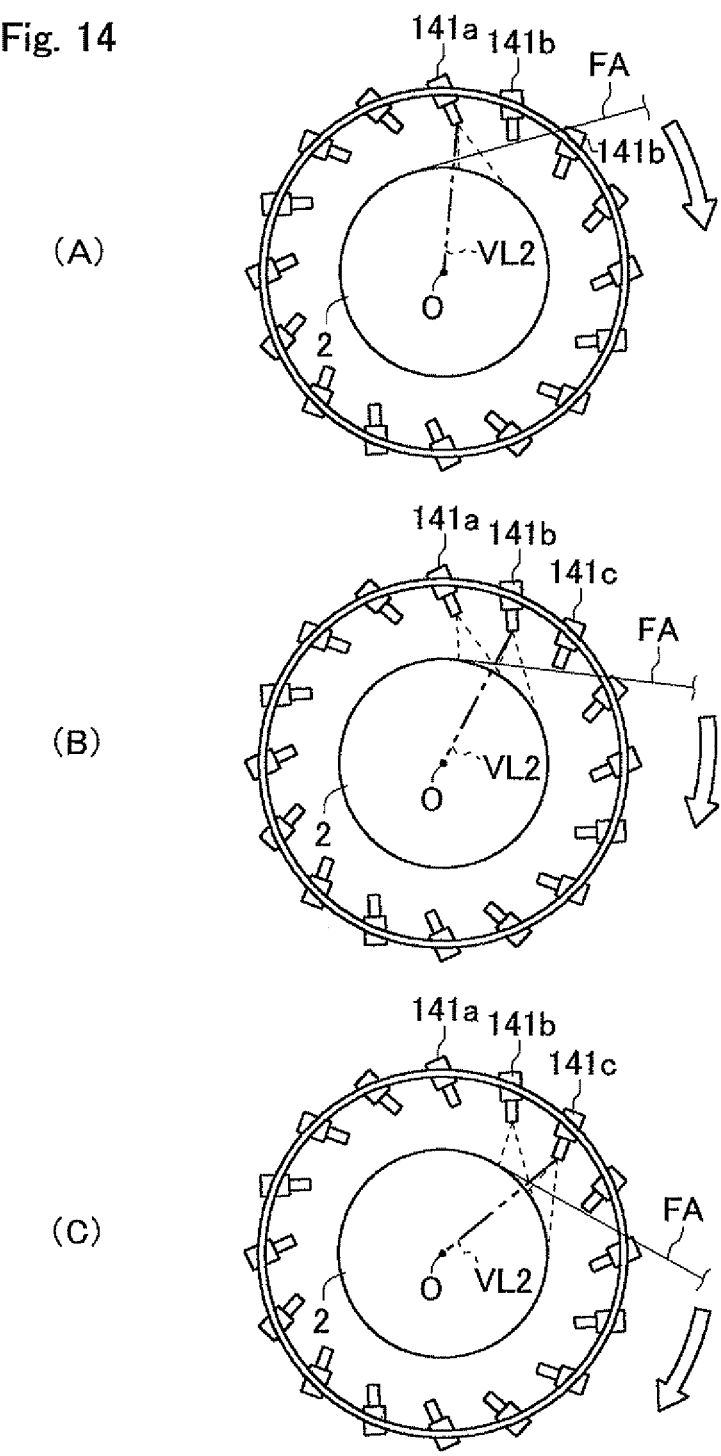
FIG. 14 It is a drawing of another embodiment of spraying of resin with the hoop winding device.

FIG. 14 is a drawing of another spraying of resin with the hoop winding device 30.

As shown in FIGS. 14A to 14C, by rotating the fiber bundle FA by the rotation of the mounting table 36, the fiber bundle FA is wound round the outside peripheral face 2a of the stopped liner 2. At this time, the control part 151 specifies the position of the fiber bundle FA to be wound round the liner 2 and selects one or more resin spray nozzles 141 which can spray resin to the fiber bundle FA at the specified position before wound round the liner 2. Then, the control part 151 operates the electromagnetic resin valves 146 and the electromagnetic air valves 147 corresponding to the selected resin spray nozzles 141. This embodiment differs from the above embodiment on the point that the spraying with the resin spray nozzles 141 before switching is stopped after starting the spraying with the resin spray nozzles 141 after switching.

At the state of FIG. 14A, the control part 151 selects and operates the resin spray nozzle 141a corresponding to the position of the fiber bundle FA. At the state of FIG. 14B, the control part 151 selects and operates the next resin spray nozzle 141b corresponding to the rotation of the fiber bundle FA and continues operating the resin spray nozzle 141a. At the state of FIG. 14C, the control part 151 selects and operates the next resin spray nozzle 141c and continues operating the resin spray nozzle 141b. At this time, the resin spray nozzle 141a is stopped.

Accordingly, the control part 151 specifies the position of the fiber bundle FA and actuates the resin spray nozzles 141 corresponding to the position of the fiber bundle FA so as to switch the resin spray nozzles 141 spraying resin synchronously with the rotation of the fiber bundle FA. Then, the control part 151 stops the spraying with the resin spray nozzles 141 before switching after starting the spraying with the resin spray nozzles 141 after switching.

Accordingly, the spraying with the resin spray nozzles 141 before switching is stopped after starting the spraying with the resin spray nozzles 141 after switching, whereby the resin spray RS injected from the resin spray nozzle 141 at the upstream side is engulfed by the resin spray RS ejected from the resin spray nozzle 141 at the downstream side and the scattering is suppressed. Since the sprayed resin flows along the outside peripheral face 2a of the liner 2, scattering of resin can be suppressed, whereby the available percentage of resin can be prevented from being worsened.

The flow rate of the resin is the highest at the position just near the spray port 141N and becomes lower corresponding to the distance from the spray port 141N. Therefore, for example, the resin injected from the resin spray nozzle 141a and reaches the position near the outside peripheral face 2a of the liner 2 is engulfed by the resin spray RS with lower flow rate at the position near the spray port 141N of the resin spray nozzle 141b at the downstream side. Accordingly, scattering of resin can be suppressed, whereby the available percentage of resin can be prevented from being worsened.

In this embodiment, fundamentally, resin is always sprayed from the two or more resin spray nozzles 141 so that the resin is supplied to the wider range along the fiber bundle FA, whereby there is an advantage that unevenness of spreading is hardly caused at the time of the switching.

The present invention is not limited to the embodiments mentioned above, and various alternations can be employed. For example, though the filament winding apparatus 1 is constructed so that the fiber supply guide 136 guides the plurality of the fiber bundles FA closely and in parallel to each other along the outside peripheral face 2a of the liner 2, the fiber bundles FA may alternatively be divided into a plurality of positions and then supplied to the outside peripheral face 2a of the liner 2. In this case, the plurality of the resin spray nozzles 141 corresponding to the plurality of the fiber bundles FA is operated so as to switch the resin spray nozzles 141 spraying resin synchronously with the rotation of the fiber bundles FA.

The technical scope of the present invention is not limited to the embodiments mentioned above and is not limited to the shapes of the embodiments. The technical scope of the present invention extends widely over the whole scope of technical idea intended truly by the present invention which is disclosed by the matters described in the specification and the drawings.

INDUSTRIAL APPLICABILITY

The present invention can be employed for an art of a filament winding apparatus.

The invention claimed is:

1. A filament winding apparatus in which a liner is transferred while being rotated and a fiber bundle guided by a fiber supply guide arranged around a locus of the liner is wound round an outside peripheral face of the liner, comprising:
a resin supply nozzle spraying resin to the fiber bundle before wound round the liner,
characterized in that
the resin supply nozzle sprays resin to a downstream side in the rotational direction of the liner about an imaginary line determined by a straight line connecting a spray port of the resin supply nozzle to a rotational axis of the liner.

2. The filament winding apparatus according to claim 1, wherein the resin supply nozzle sprays resin in parallel to an imaginary plane determined by a plane perpendicular to the transfer direction of the liner.

3. The filament winding apparatus according to claim 1, wherein the resin supply nozzle sprays resin to a front side of the liner about an imaginary plane determined by a plane perpendicular to the transfer direction of the liner and crossing the spray port.

4. The filament winding apparatus according to claim 1, wherein the resin supply nozzle is arranged so as to spray resin in parallel to or substantially parallel to the transfer direction of the fiber bundle before wound round the liner.

5. The filament winding apparatus according to claim 1, wherein the resin supply nozzle can advance/retract about the outside peripheral face of the liner.

6. The filament winding apparatus according to claim 1, wherein
the resin supply nozzle includes a first resin supply nozzle arranged at a front side in the transfer direction of the liner and a second resin supply nozzle arranged at a rear side in the transfer direction of the liner, and
the first resin supply nozzle sprays resin to the fiber bundle mainly and the second resin supply nozzle sprays resin to the fiber bundle complementarily.

7. A filament winding apparatus having a hoop winding device comprising:
a winding part rotating a fiber bundle about a liner which is to hold the fiber bundle so as to wind the fiber bundle round the liner; and
a resin impregnation part in which a plurality of resin injection nozzles injecting resin to the fiber bundle before wound round the liner are arranged around the liner,
characterized in that
each of the resin supply nozzle is arranged so as to spray resin to a downstream side in the rotational direction of the liner about an imaginary line determined by a straight line connecting a spray port of the resin supply nozzle to a rotational axis of the liner.

8. The filament winding apparatus according to claim 7, wherein one or more resin injection nozzles of the plurality of the resin injection nozzles spray resin to the rotated fiber bundle, and the resin spray nozzles spraying the resin is switched synchronously with the rotation of the fiber bundle.

9. The filament winding apparatus according to claim 8, wherein the resin impregnation part stops the spraying by the resin injection nozzles before switched after starting the spraying by the resin injection nozzles after switched.

* * * * *